US012726474B1

(12) United States Patent
Abu Hussein et al.

(10) Patent No.: US 12,726,474 B1
(45) Date of Patent: Sep. 1, 2026

(54) EAR PHONE CUED, PICTURE BASED AUTHENTICATION SYSTEM AND METHOD

(71) Applicant: UNIVERSITY OF JEDDAH, Jeddah (SA)

(72) Inventors: Abdullah Abu Hussein, St. Cloud, MN (US); Faisal S. Alsubaei, Jeddah (SA)

(73) Assignee: University of Jeddah, Jeddah (SA)

( * ) Notice: Subject to any disclaimer, the term of this patent is extended or adjusted under 35 U.S.C. 154(b) by 0 days.

(21) Appl. No.: 19/638,474

(22) Filed: Apr. 3, 2026

(51) Int. Cl.
*H04L 9/40* (2022.01)
*G06F 3/16* (2006.01)

(52) U.S. Cl.
CPC ............ *H04L 63/083* (2013.01); *G06F 3/167* (2013.01)

(58) Field of Classification Search
CPC .............................. H04L 63/083; G06F 3/167
See application file for complete search history.

(56) References Cited

U.S. PATENT DOCUMENTS 8,290,537 B2 10/2012 Lee et al.
8,881,251 B1 * 11/2014 Hilger .................. H04L 63/083 726/19
11,341,496 B2 * 5/2022 Abrams ............... G09B 21/006
12,081,611 B1 9/2024 Britto et al.
12,393,663 B1 8/2025 Alsubaei et al.
2010/0043062 A1 * 2/2010 Alexander ........... H04L 9/3226 726/6
2014/0059674 A1 * 2/2014 Sun ......................... G06F 21/44 726/19
2019/0384898 A1 * 12/2019 Chen ....................... G06F 21/36
2020/0184052 A1 * 6/2020 Ellison .................... G06F 21/36
2021/0004448 A1 * 1/2021 Lee ....................... G06F 3/0482
2021/0306734 A1 * 9/2021 Keady .................... A61B 5/123
2025/0247238 A1 * 7/2025 Grigorov .............. G06F 21/606
2025/0252209 A1 * 8/2025 Sathyanarayana .......................... G06F 21/6245

OTHER PUBLICATIONS

Exploring numerosity based haptic and audio PIN entry (Year: 2012).*
SelfiePass_A_Shoulder_Surfing_Resistant_Graphical_Password_Scheme (Year: 2021).*

* cited by examiner

*Primary Examiner* — Philip J Chea
*Assistant Examiner* — Jasmine Mochen Day
(74) *Attorney, Agent, or Firm* — WCF IP

(57) ABSTRACT

An earphone-cued picture-based authentication system and method are disclosed. The system authenticates a user by requiring interaction with predefined regions of a displayed image, where the correct interaction is guided by private audio cues delivered through earphones. Audio cues provided to the ears indicate which subset of image regions the user must select at each step. This multimodal authentication mechanism significantly improves resistance to shoulder-surfing, and visual inference, while maintaining usability on touchscreen and desktop devices.

7 Claims, 9 Drawing Sheets

200
RECEIVES USER REGISTRATION REQUEST — 202
TRANSMITS REQUEST FOR USER ID AND A PICTURE SELECTION — 204
RECEIVES USER ID AND A PICTURE SELECTION FROM USER AS THE AUTHENTICATION IMAGE — 206
TRANSMITS A REQUEST FOR A SEQUENCE OF n>=3 SECRET LOCATIONS (i.e., PASSWORD) ON THE SELECTED PICTURE — 208
RECEIVES A SEQUENCE OF THE SECRET LOCATIONS (i.e., PASSWORD) ON THE RECEIVED PICTURE — 210
TRANSMITS A REQUEST FOR DECEIVING LOCATION d=1 ON THE RECEIVED PICTURE — 212
RECEIVES A DECEIVING LOCATION d (i.e., DECOY LOCATION) — 214
TRANSMITS THREE AUDIO BEEP PATTERNS (LONG BEEP, SHORT BEEP, MULTIPLE BEEPS) FOR USER TO SELECT FROM. THIS WILL DEFINE SCREEN TAPPING PATTERN (LONG TAP, REGULAR TAP, DOUBLE SHORT TAPS) ACCORDINGLY. — 216
RECEIVES USER INPUT $t_c$ BASED ON AUDIO BEEP PATTERN. — 218

FIG 4B
320
TRANSMIT DECEIVING LOCATION (S)
322
RECEIVE REQUEST FOR BEEP PATTERN
324
GENERATE BEEP PATTERN
326
TRANSMIT BEEP PATTERN N TO EARPHONE DEVICE

EAR PHONE CUED, PICTURE BASED AUTHENTICATION SYSTEM AND METHOD

FIELD OF THE INVENTION

The invention is related to a multimodal authentication system for providing enhanced secure access to a user of a device, such as a touch screen-equipped systems (e.g., phones, tablets, computers), that is to be connected with a network.

BACKGROUND

Traditional password-based authentication mechanisms are vulnerable to a wide range of attacks, including keylogging, phishing, dictionary attacks, and shoulder surfing. Graphical password systems mitigate some of these weaknesses but remain susceptible to observation attacks. There exists a need for an authentication mechanism that combines graphical interaction with a private, user-only communication channel to enhance security without imposing excessive cognitive burden.

U.S. Pat. No. 12,393,663 to Alsubaei et al., which is herein incorporated by reference, describes a system and method for a vibration aided, picture based authentication system. Alsubaei et al. describe the many prior processes which have been used to authenticate a user including password protection, image password protection, recall-based systems, recognition-based graphical schemes, electroencephalography, selection of an image-based password randomly positioned among other images on a screen, hybrid methods, etc. Alsubaei et al. recognized that there was a need for authentication systems that were not subject to breaking by over-the-shoulder or close-by onlookers while a person is being authenticated at a computer or kiosk or the like, but where the person was not required to memorize a substantial amount of data, and the system and method was easy to use. In short, while a system and method might be highly secure, if too many demands are put on the person being authenticated he or she may find it too difficult to use and may not be able to gain access to a computer system when they need it. The system provided by Alsubaei et al. provided an image-based system, where the person was also provided with tactile feed back. In operation, the person being authenticated would be presented with an image that had a number of locations thereon, some secret and some deceptive, where the person being authenticated would be provided with vibratory sensations which were dependent on where he or she touches an image.

There remains a need for alternative authentication systems and methods that are highly secure, but simple to use.

SUMMARY

The present invention introduces an authentication system that integrates picture-based input with earphone-delivered audio cues. During reregistration, users define two sets of image interaction points (i.e., secret and deception spots). During authentication, an audio cue delivered to an earphone or headphone of the user which indicates which set the next interaction must come from. Because the audio cues are not observable by nearby attackers, the system provides strong protection against shoulder surfing and replay attacks.

DESCRIPTION OF THE DRAWING FIGURES

Figure 7:
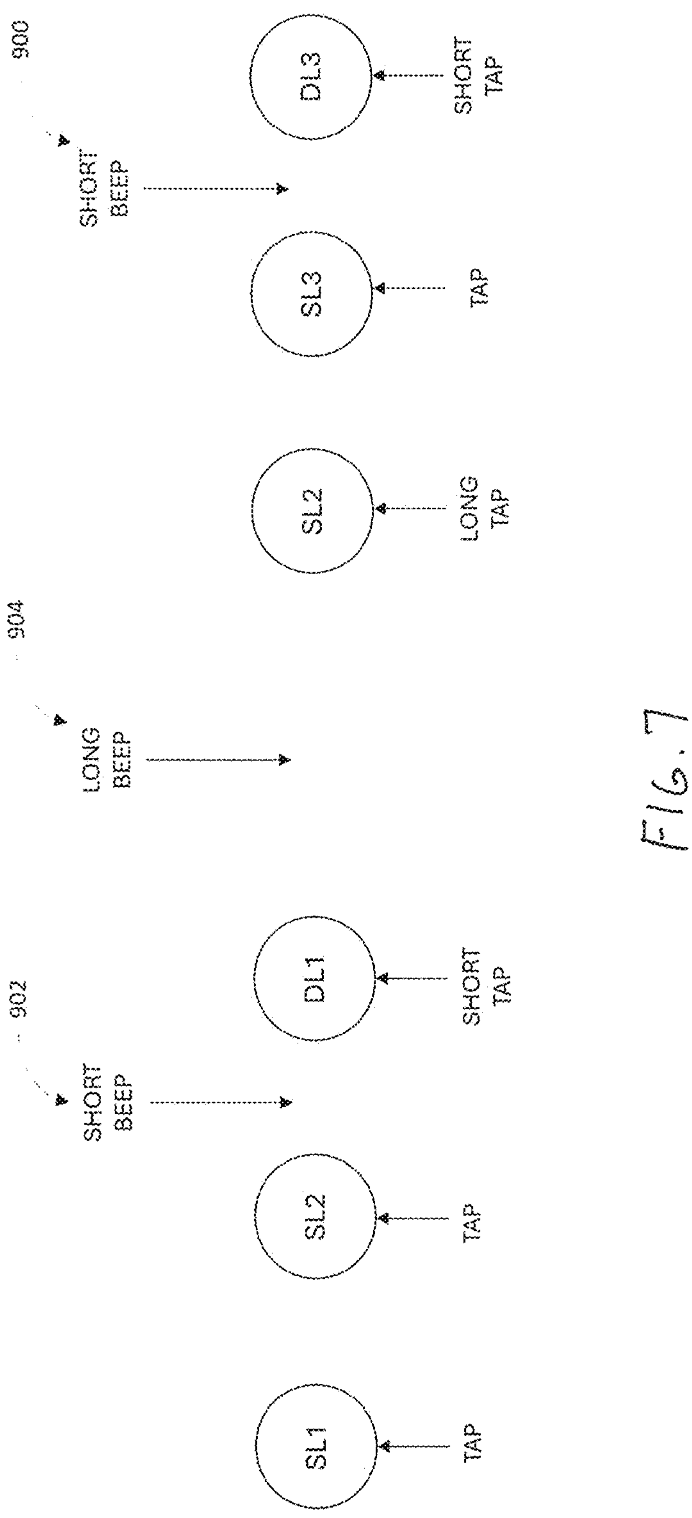
Figure 8A:
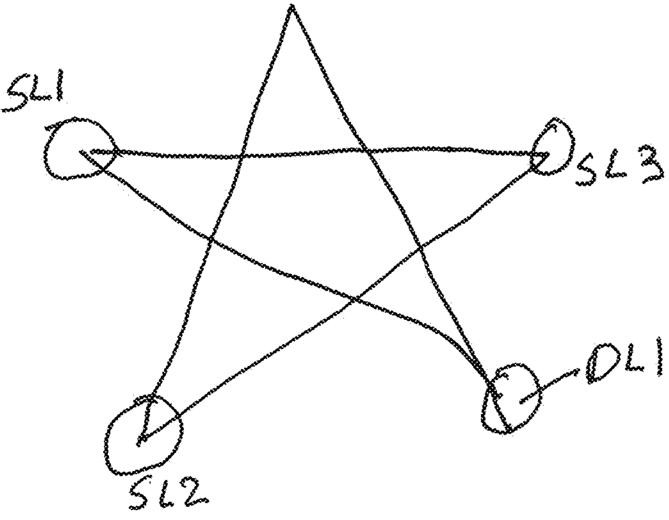
Figure 8B:
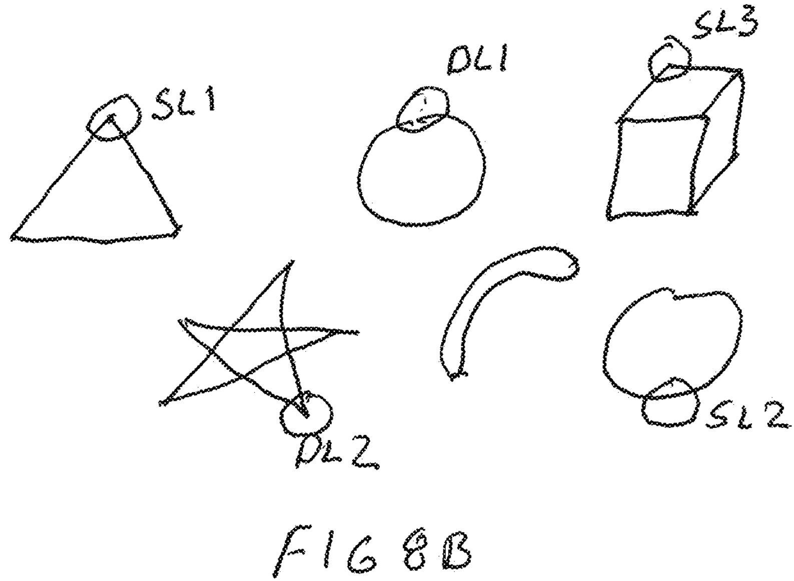

FIG. 7 schematically illustrates a sequence of secret and deceiving locations and audible patterns associated with the deceiving locations, to be used by the user on the smartphone for authentication on the server; and FIGS. 8A and 8B illustrate an example images used by the smartphone and server to choose the secret and deceiving locations according to an embodiment, and to later authenticate the user.

DETAILED DESCRIPTION

The system comprises infrastructure of a service provider and the headphone or earphone equipped smartphone, tablet or computer of a plurality of users. The smartphone, tablet, or computer of each user also includes a display on which an image, selected and transmitted by the service provider, will be displayed during registration and authentication. During registration, a user selects multiple sets of points on a displayed image, and the system generates an audio cue to the user, preferably using both left and right ears in the case of a headphone system, and validates the user's interaction against an expected point set and sequence.

Some of the advantages of the system and method include that there is strong resistance to shoulder surfing because the shoulder surfer has no means to hear the audio cues, and because the shoulder surfer cannot observe reactions that a user might have when using a picture based system where audio feedback is provided. The method does not have any reliance on textual passwords, although in some hybrid applications textual passwords could be used in combination for increased security. The system and method is compatible with mobile devices that are linked to earphones, and can be used in cases where shoulder surfer is likely to exist (e.g., at public transportation). Furthermore, the system and method provides scalable security through the use of multiple point sets. A particular advantage of the system and method is that it is configured for private authentication guidance through an audio channel which is heard only by the user being authenticated.

According to an embodiment, the system and method enhances a security mechanism for a wired or wireless communication between a user's electronic device (e.g., a smartphone, tablet, computer) by adding a layer of security to an existing image-based authentication method. Specifically, one or two deceiving locations (in addition to secret locations that constitute the password) are added on an image. An associated audible sequence is provided to the headphones or earphones of the user to guide him or her through the secret and deceiving locations on the image. Only the user who is wearing the headphones or earphones can hear the audible cues, and shoulder attackers do not have any access to this information which is needed to successfully navigate the image based password. The audible sequence is preferably a series of beeps. For example, one beep could indicate one deceptive location on the image, and two beeps could indicate another deceptive location on the image. A variation, when a user is using a pair of headphones instead of a single earphone, might involve a beep in the left ear for one deceptive location and a beep in the right ear for a second deceptive location. Once registered and the user is being authenticated, he or she will touch various points on the image (secret spots) in a particular order. The locations and their order of being touched constitutes the password to gain access to the service infrastructure (which could be controlled by a bank, financial institution, or any other institution where secure access is at a premium). However, in the method and system described herein, the user will be sent audible cues during the time period when the user is touching the secret spots on the image which direct him or her to touch specific deceptive spots on the image. Thus, if a shoulder surfer is able to observe the image and the user touching the spots, he or she will not be able to decipher which spots being touched are part of the password and which spots being touched are not part of the password. Each time the user attempts to access the infrastructure, the audible cues can be provided at a different time during entry of the password such that the order the user touches spots (secret spots or deceptive spots) can appear to vary, from the prospective of the shoulder surfer, with each authentication. Furthermore, the system might employ a set of different images, where the password of secret spots (i.e., the locations and order of touching them) and the deceptive spots is registered for each image in the set by the user (and thus known by only the user) and then used by the user during authentication. In this way, from the prospective of the shoulder surfer, different images would be being used by the user for authentication, with different spots being touched on those images.

Figure 1:
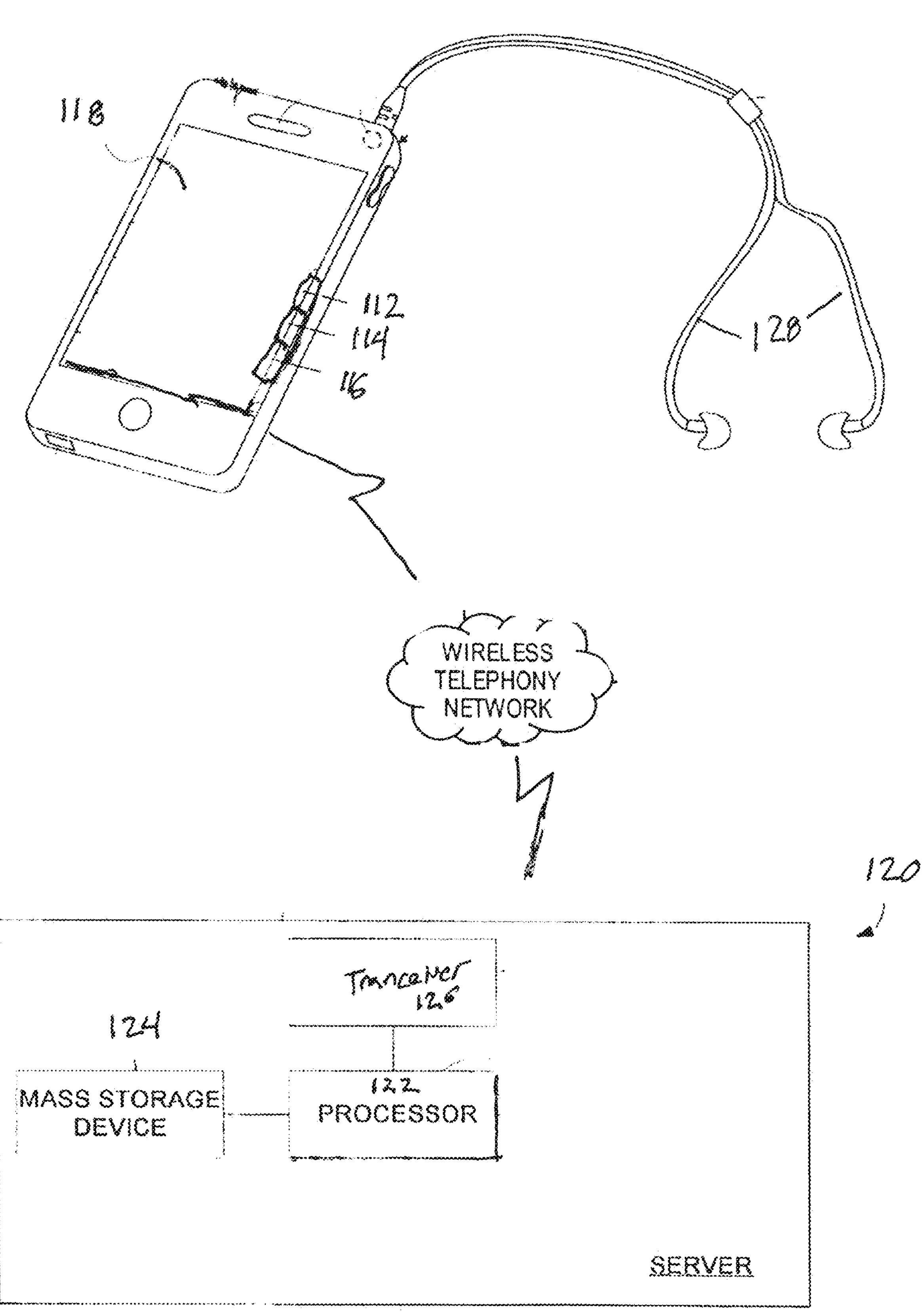
FIG. 1 is a schematic diagram of an exemplary authentication system including a service provider infrastructure and a user smartphone.

The shoulder-attack resistant method introduced herein requires a registration phase between an electronic device 110 of the user (a smartphone in the following embodiments, but as noted above the electronic device can be a computer, or tablet) and a server 120 of the service provider, which are schematically illustrated in FIG. 1 as system 100. The registration phase takes place prior to the user accessing the services provided by the service provider. FIG. 1 illustrates the smartphone 110 having at least a processor 112 for processing data, a memory 114 for storing the data and rules implemented during the authentication phase, and a transceiver 116 for communicating with the server 120. The server 120, similar to the smartphone 110, includes at least a processor 122, a memory 124, and a transceiver 126. One skilled in the art would understand that each of the smartphone and server may include other components, for example, a screen 118, and keyboard for inputting information, etc.

FIG. 1 shows that the electronic device 110 which has a display 118 which displays an image for registration and authentication. FIG. 8A shows a simplistic image of a star which has three secret locations that are to be touched in a specific order, i.e., the left top corner SL1, then the left bottom corner SL2, and then the right top corner SL3. To interrupt shoulder surfing attacks, the deceptive location or spot DL1 is cued to be audible cue to the user randomly before or after the user touches SL1, SL2, or SL3. Thus, the shoulder surfer would be fooled into thinking that DL1 is part of the code, and would not know that SL1 must be touched before SL2 and that SL3 must be touched after SL2 in order to provide the image based password. Preferably, the system and method of the invention would employ slightly more complex images. FIG. 8B shows an image with six different objects that might be displayed on the display 118 for authentication purposes. Here, the image code would be a point on the top of the triangle SL1, then a point on the bottom of the right most circle SL2, and the a point at the top left of the cube SL3. There would be two deceptive locations that are at the top of the center circle (DL1) and the bottom right of the star (DL2). Thus, if one did not know the code and attempted to enter a code where the crescent is touched, or the bottom corners of the triangle are touched, or the top of the star is touched, etc. the code would be incorrect, and the person would be denied access to the server infrastructure. In accordance with the invention, if an authorized user who knows the code for FIG. 8B is trying to gain access to the server, during the time when he or she is touching the image, he or she will be sent audio cues, e.g., one beep for deceptive spot 1 (DL1) or two beeps for deceptive spot 2 (DL2) (and in some embodiments a beep in the left ear for deceptive spot 1 (DL1) and a beep in the right ear for deceptive spot 2 (DL2). Thus, if the authorized user is being observed by a shoulder surfer attacker, the attacker might see the user touch the top of the star (SL1), then the top of the center circle (DL1) because of an audio cue, e.g., one beep, then the bottom of the right most circle (SL2), then the right bottom corner of the star (DL2) because of a second audio cue, e.g., two beeps, and then the top left of the cube (SL3) to gain access. The authorized user would have touched the SL1, SL2, and SL3 in order, but would have also touched two decoys (DL1) and (DL2) because of audio cues he or she received. The shoulder surfer would not be able to ascertain which of the touches are required, and which, if any, of the touches were decoys. Furthermore, in an embodiment of the invention, the timing of the audio cue will vary (e.g., cue for DL1 before the user touches SL1, etc.) as well as the order for the decoy will vary (e.g. DL2 before DL1).

While the image displayed on display 118 has been described as a single image for this example, the server may use multiple images known and registered with the user to provide extra security. Thus, a shoulder surfer that, for example, commutes on the same train as the user, would observe more than one image password over, for example, weeks of commuting with the user. Thus, in addition to not knowing the sequences of spots on an image to touch due to the random audible cueing for deceptive locations, the shoulder surfer would be confounded by the user being authenticated using different images at different times.

FIG. 1 also shows a set of headphones 128. The headphones 128 are worn by the user when he or she is using the electronic device 110 to access the server 120. The electronic device 110 provides a private, audible signal to the wearer of the headphones 128 to cue the user on how to interact with a subset of predefined imaging points on an image displayed at the electronic device 110. This interaction allows the user to use the image based password displayed at his or her electronic device to access the server 120.

Figure 2:
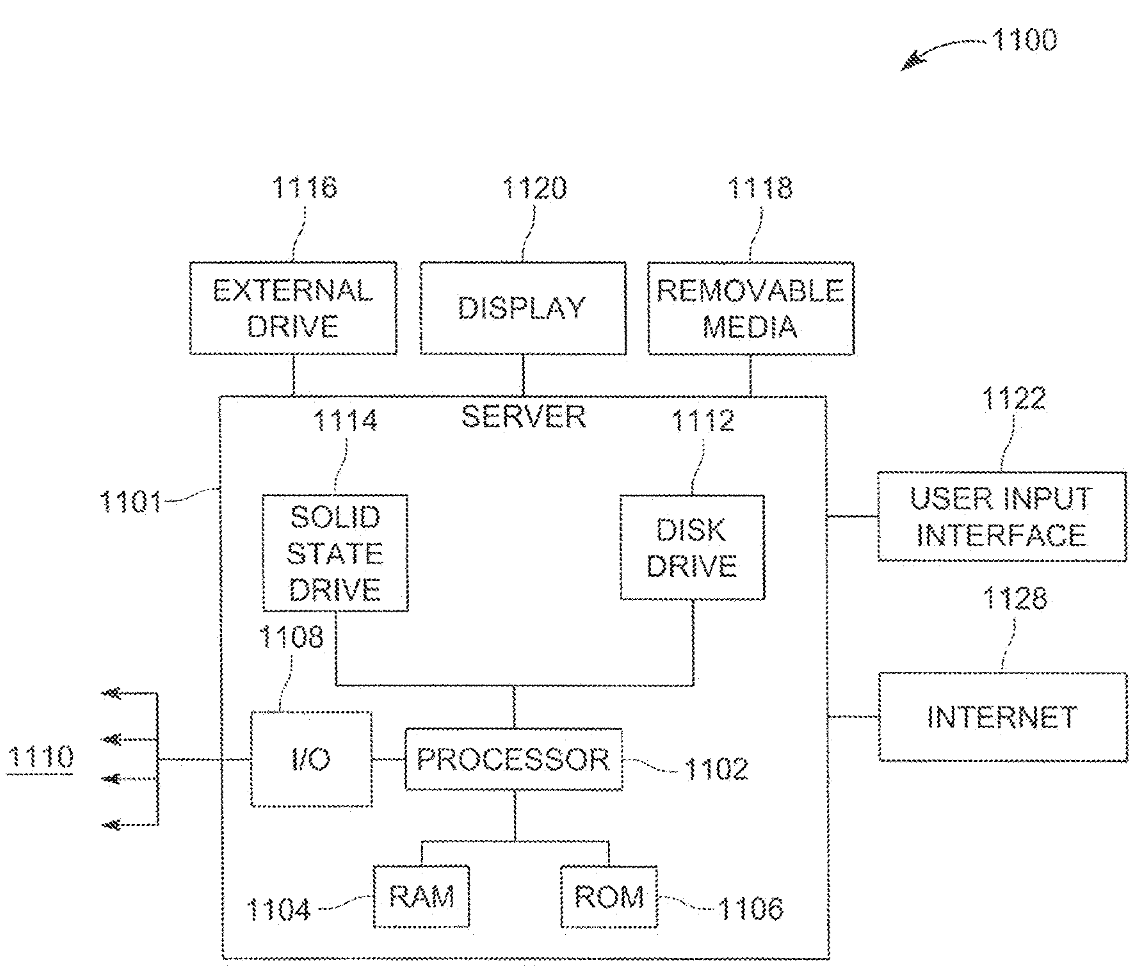
FIG. 2 is a schematic diagram of a server of the service provider or an electronic device of the user.

The procedures and methods of the headphone or earphone cued, picture or image based authentication method of this disclosure may be implemented in a computing device (e.g., server 120, mobile device 110, personal computer, IoT device, etc.) as illustrated in FIG. 2. Hardware, firmware, software or a combination thereof may be used to perform the various steps and operations described herein. A computing device 1100 suitable for performing the activities described herein may include a server 1101. Such a server 1101 may include a central processor (CPU) 1102 coupled to a random access memory (RAM) 1104 and to a read-only memory (ROM) 1106. ROM 1106 may also be other types of storage media to store programs, such as programmable ROM (PROM), erasable PROM (EPROM), etc. Processor 1102 may communicate with other internal and external components through input/output (I/O) circuitry 1108 and bus 1110 to provide control signals and the like. Processor 1102 carries out a variety of functions as are known in the art, as dictated by software and/or firmware instructions. Server 1101 may also include one or more data storage devices, including hard drives 1112, solid-state drives 1114, and other hardware capable of reading and/or storing information, such as DVD, etc. In one embodiment, software for carrying out the above-discussed steps may be stored and distributed on a memory stick 1116, a solid state storage device 1118 or other form of media capable of portably storing information. These storage media may be inserted into, and read by, devices such as solid state drive 1114, disk drive 1112, etc. Server 1101 may be coupled to a display 1120, which may be any type of known display or presentation screen, such as LCD, plasma display, cathode ray tube (CRT), etc. A user input interface 1122 is provided, including one or more user interface mechanisms such as a mouse, keyboard, microphone, touchpad, touch screen, voice-recognition system, etc.

Server 1101 may be coupled to other devices or systems, such as a connected database or one or more databases accessible remotely. That is, the server may be part of a larger network configuration as in a global area network (GAN) such as the Internet 1128, which allows connection to various landline and/or mobile computing devices.

However, in some embodiments, the apparatus may be embodied as a chip or chip set, as an alternative to a computing device. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 1102 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 1102 may be configured to execute instructions stored in the memory device 1104 or otherwise accessible to the processor. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (e.g., a pass-through display or a mobile terminal) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

Figure 3:
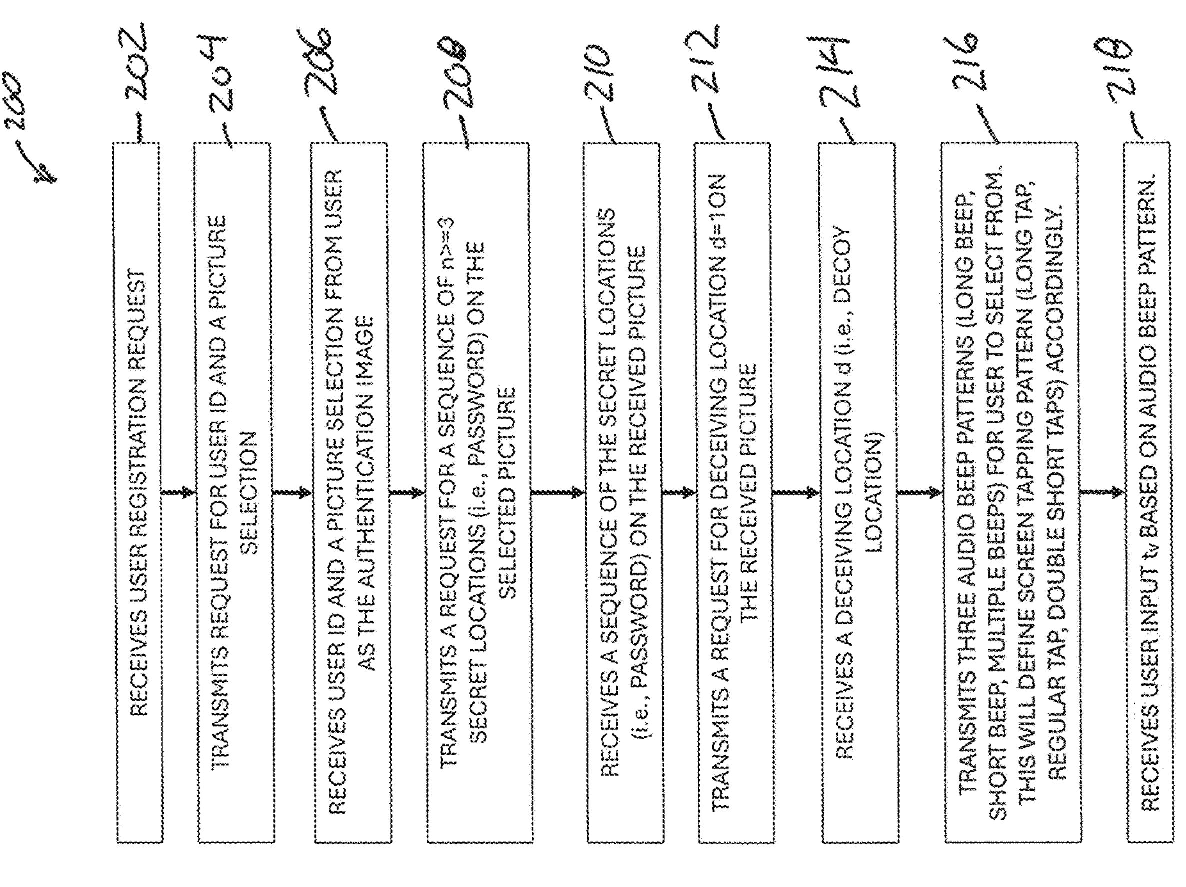
FIG. 3 is a flowchart of an exemplary method performed by the service provider for registering the smartphone of the user using a combination of secret and deceiving locations in an image and an audio pattern associated with the deceiving locations.
Figure 4A:
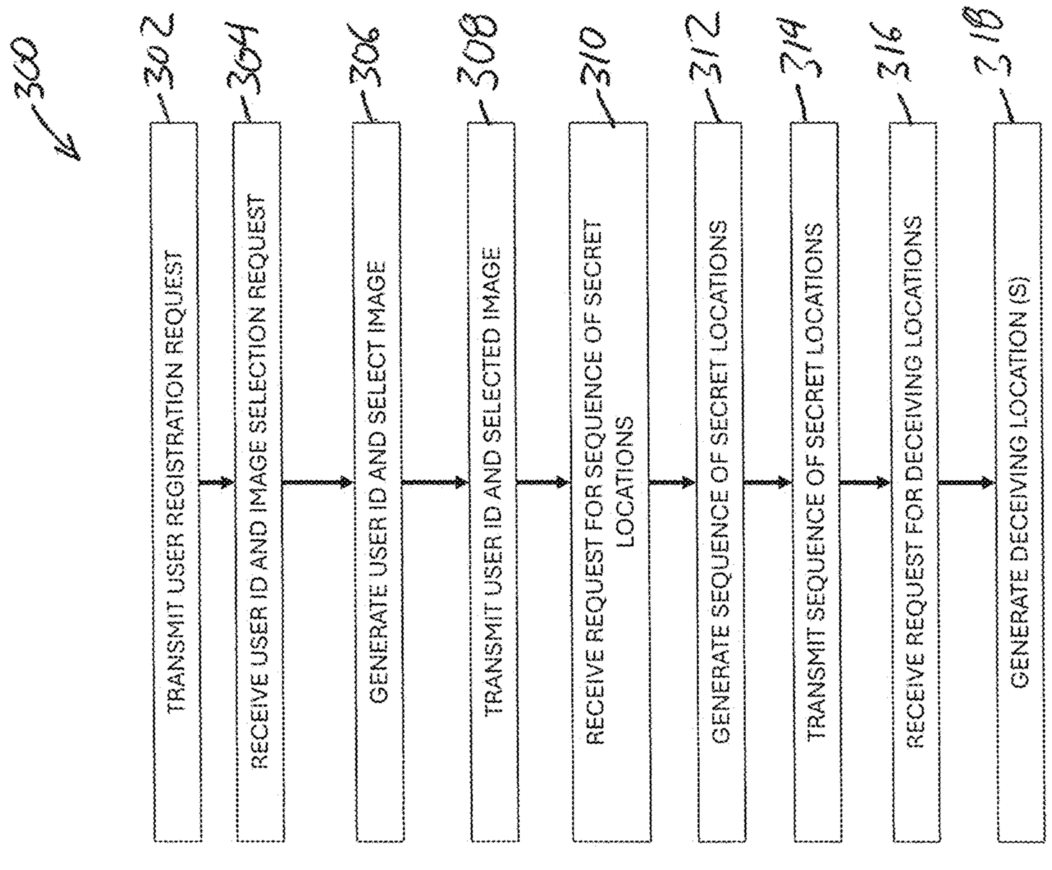
FIGS. 4A and 4B is a flowchart of a method performed by the smartphone for registering on the server of the service provider using a combination of secret and deceiving locations in an image and an audio pattern associated with the deceiving locations.
Figure 4B:

The registration phase between the smartphone 110 and the server 120 is schematically illustrated in the flowchart of FIG. 3, from the point of view of the server 120. FIGS. 4A and 4B presents the registration phase from the point of view of the smartphone 110. The user of the smartphone 110 transmits in step 302, to the server 120, a request for registration, as illustrated in the method 300 shown in FIG. 4A. The server 120 receives in step 202 of the method 200, illustrated in FIG. 3, the user registration request from the smartphone 110. In these steps, the user of the smartphone is trying to establish, for example, an account with the service provider that owns the server 120. The server 120 then transmits in step 204, to the smartphone 110, a request to input a user ID (e.g., username or email) and to make an image selection. For example, the user might select the simplistic image of FIG. 8A or the more complex image of FIG. 8B. However, literally almost any image including photographs might be used in the practice of the invention. This information may be displayed on the smartphone's screen 118. The user receives the user ID and image selection request in step 304 and generates, in step 306, the user ID and selects an image to be used for inputting the password. In one embodiment, the server 120 sends a group of images to the user and the user selects one of those images. In another embodiment, the user selects an image from its own database, for example, a personalized image. Then, in step 308, the user transmits the generated user ID and the selected image to the server 120. This step corresponds to step 206 in FIG. 3, in which the server 120 receives from the user, the generated user ID and the selected image.

Next, the server 120 transmits in step 208, and the smartphone 110 receives in step 310, a request for a sequence of n secret locations $SL_n$ on the selected image, where n is an integer equal to or larger than 3. The selection of the secret locations $SL_n$ constitutes the password to be used by the user when logging into the server 120. Thus, as discussed by example above, the order of the secret locations (when input on the selected image) is the password of the user. The user selects in step 312 the secret locations $SL_n$, as schematically illustrated in the examples of FIGS. 8A and 8B, thus generating the sequence of secret locations $SL_n$. The image can be any stored and selected image.

Note that each secret location $SL_n$ is associated with a given region on the image. As long as the user taps with his or her finger a specific region (e.g., the left top corner of the star for FIG. 8A), the smart phone associates that region with a corresponding secret location $SL_n$ and generates a signal indicative of that location. The size of the region may be preconfigured or selected by the user during the registration phase. As discussed above, FIG. 8A shows star where the user can select that SL1 is the top left corner, SL2 is the bottom left corner, and SL3 is the top right corner. As discussed above, when selecting the secret locations, the order of the secret locations $SL_1$ to $SL_3$ is also an important authenticating factor, as the server will recognize the three locations only if introduced in the selected order. Thus, the sequence of secret locations $SL_n$ is characterized by two factors, the physical locations of the $SL_n$ in the selected image, and the order in which these physical locations need to be tapped by the user. The smartphone 110 transmits in step 314 the sequence of physical locations to the server 120, and the server receives in step 210 the sequence of physical locations.

Next, the server 120 transmits in step 212, to the smartphone 110, a request for deceiving locations $DL_k$ on the selected image, where k is equal to 1 or larger. The smartphone 110 receives in step 316 the request for the deceiving locations $DL_k$ and generates in step 318 at least one deceiving location $DL_1$, as schematically illustrated in FIG. 8A. The deceiving location $DL_1$ may be located anywhere in the image, even on top of a secret locations $SL_n$. In one embodiment, although tapping the deceiving location on the selected image is required, the deceiving location is not part of the password (i.e., the order set of secret locations). Then, the smartphone 110 transmits in step 320 the selected deceiving location $DL_1$ to the server 120 and the server receives in step 214 the deceiving location $DL_1$. As discussed above in conjunction with FIG. 8B, the system and method of this invention might use a single beep to signal that DL1 (the top of the center circle) is to be touched as a first deceiving location, and that a two beeps are used to signal that DL2 (the bottom right corner of the star) is to be touched. Alternatively, when a pair of headphones are used, the first deceiving location might be cued by a beep in the left ear while the second deceiving location might be cued by a beep in the right ear.

The server 120 transmits in step 216, to the smartphone 110, a request for selecting an audible pattern from a set of audible patterns. The selection of audible patterns may include, for example, long beeps, short beep, multiple beeps, etc. for a user to select from. This will define a screen tapping pattern, for example, long tap, regular tap, double short taps, etc. that corresponds to the selected audible patent of the set of audible patterns.

With reference to FIG. 4B, in operation, the smartphone, when receiving a specific audible pattern at step 320, will prompt the user to tap the screen of the phone, on the image at the deceiving locations $DL_k$, with a specific tap corresponding to the selected audible tone (e.g., long tap, regular tap, double short taps, etc., respectively corresponding to a long beep, short beep, or multiple beeps, etc.) For example, a long beep delivered the headphones or earphone of the smartphone could prompt the user to apply a long tap on a deceiving location. The same is true for the short or regular beep, or the multiple beeps, i.e., they require a short or multiple tapping in response to the beeps transmitted to the headphones or earphone.

In some embodiments, a time duration of the beep could be proportional to a time duration of the tap to be applied by the user.

In some embodiments, the audible cue or tone intended to prompt the user to touch a deceiving location is only supplied to one headphone of the pair of headphones worn by the user.

The smartphone 110 receives in step 322 the request for the audible patterns, the user selects in step 324 the corresponding tapping patterns, and the smartphone transmits in step 326 the tapping patterns to the server 120. As noted above, an audible pattern defines an action required by the user when performing an authentication phase based on the selected image. The user will need to remember, that in response to the audible pattern he or she privately hears using his or her headphones or earphone from transmissions by the smartphone, to tap the screen 118 of the smartphone 110, on the deceiving locations $DL_k$, consistent with the selected audible pattern, e.g., one beep tap DL1, two beeps tap DL2. For more complexity, the user might be cued to provide a long tap by a long beep, a short tap by a short beep, double short tap for double short beep, double long tap for double long beeps, etc.

In one embodiment, a short tap is defined by a time period of about 1 ms or less while a long tap is defined by a time period larger than 1 ms. The value of 1 ms may be replaced by other values. In one embodiment, the user has the freedom to choose this value according to his or her needs. In this or another embodiment, the user may select a tapping style for each individual deceiving point $DL_k$, if more than one deceiving point is selected. The tapping may be subtle enough that the shoulder attacker cannot figure them out or simply cannot perceive them. The tapping style is received by the server 120 in step 218 and this step completes the registration phase for the user of the smartphone 110.

Figure 5:
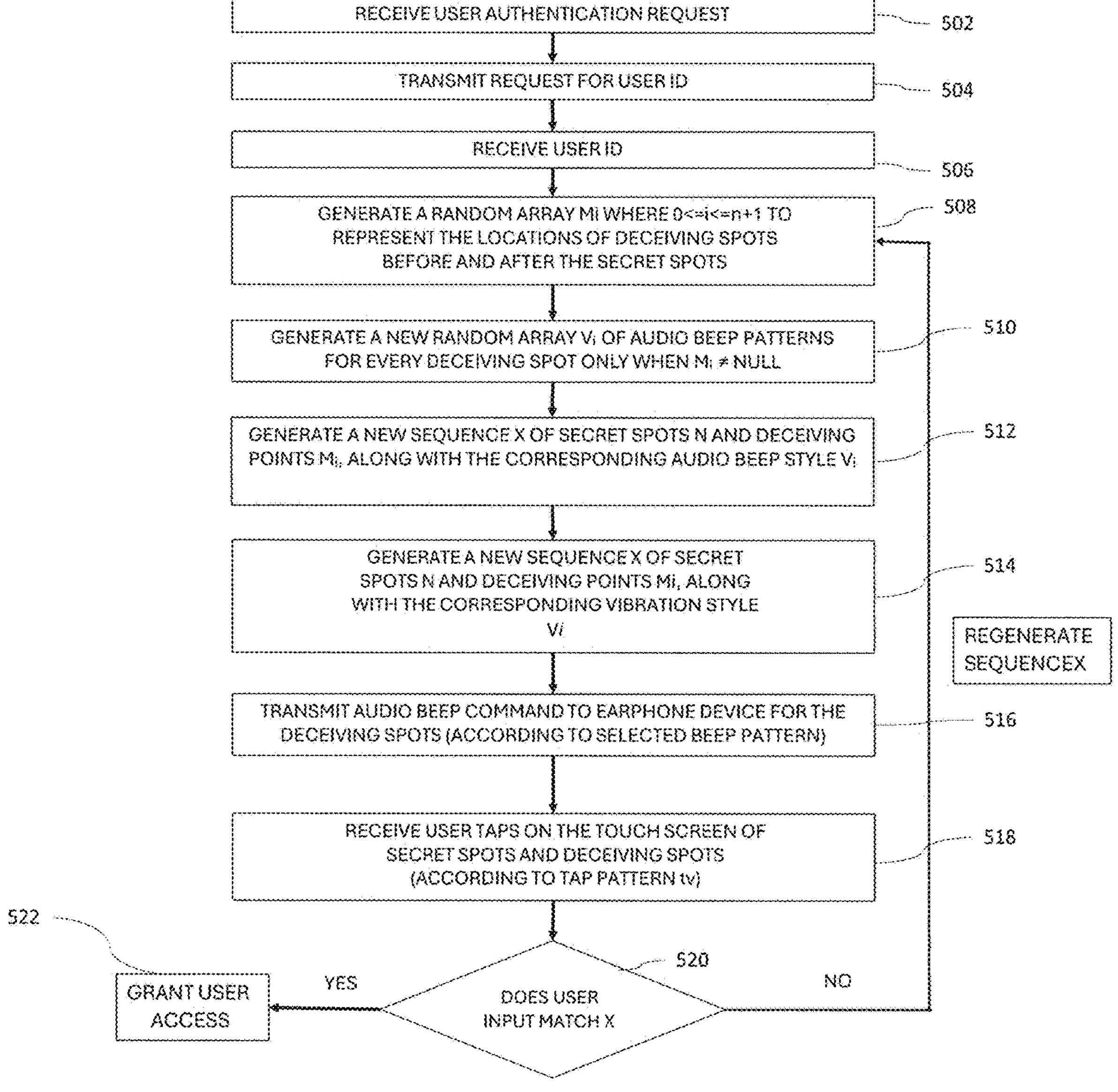
FIG. 5 is a flowchart of a method performed by the service provider for authenticating the smartphone of the user using a combination of secret and deceiving locations in an image and an audio pattern associated with the deceiving locations.
Figure 6:
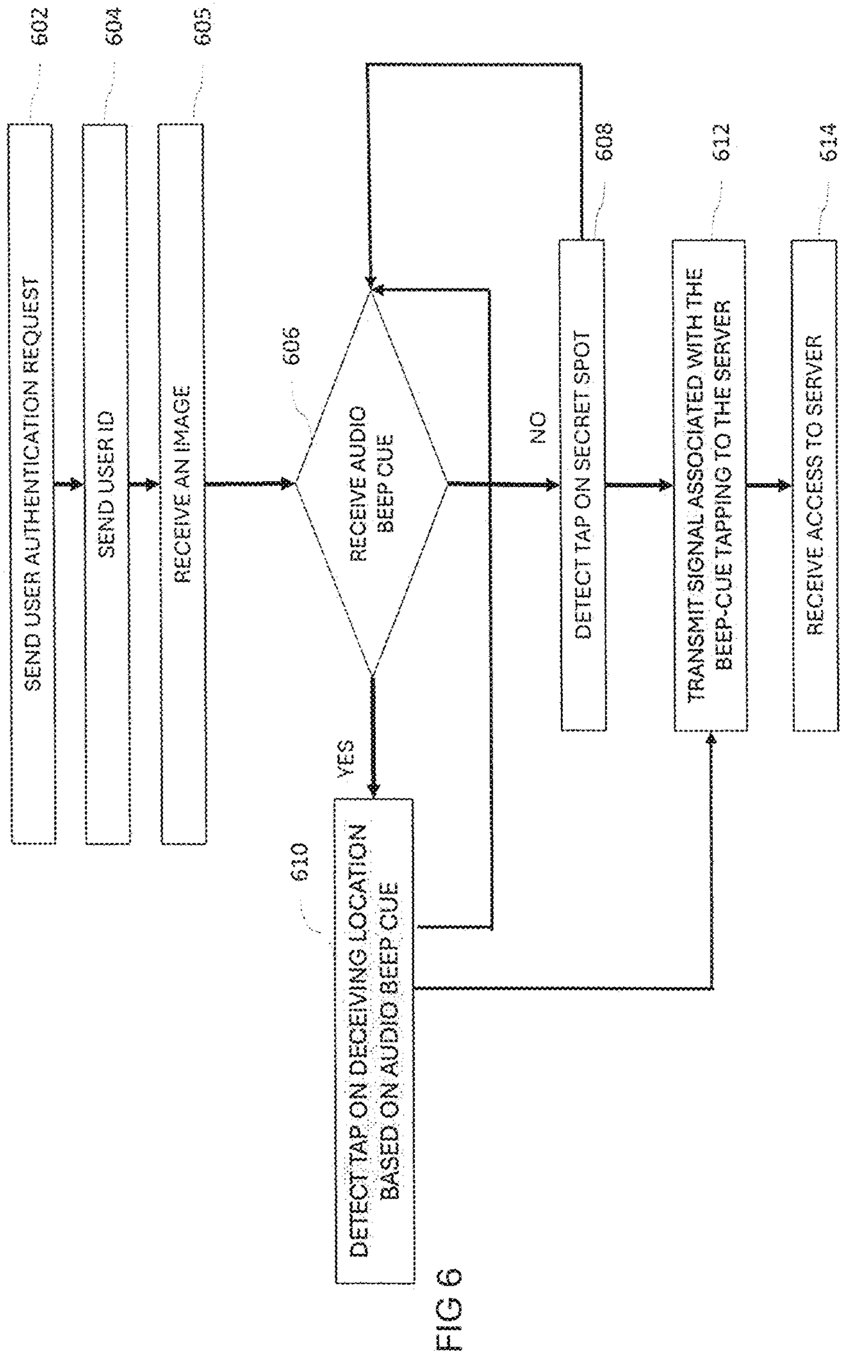
FIG. 6 is a flowchart of a method performed by the smartphone for becoming authenticated on the server, by using a combination of secret and deceiving locations in an image and an audible pattern associated with the deceiving locations.

The authentication phase is discussed with regard to FIGS. 5 and 6 which illustrates the steps performed by the server 120 and the smartphone 110, respectively. The method 500 of FIG. 5 shows the server 120 receiving in step 502 a user authentication request from the smartphone 110. The server 120 transmits, in step 504, a request to the smartphone 110, for producing the user ID which was generated in the registration phase discussed above with regard to FIGS. 3, 4A, and 4B. The user enters the user ID, into the smartphone 110, see method 600 and step 602 in FIG. 6, and the smartphone 110 sends the user ID to the server 120. The server 120 receives in step 506 the user ID.

If the user ID is found in a database associated with the server 120, the server 120 generates in step 508 a random array of deceiving locations $DL_k$, where "k" is any integer different from zero, and "k" is larger than zero and smaller than the n/2, where n is the number of secret locations $SL_n$. This means that, in this embodiment, the number of deceiving locations $DL_k$ is smaller than half the number of secret locations $SL_n$. In one embodiment, the n/2 may be replaced with another number, smaller than n. Considering that, in the example above, the user selected three secret locations $SL_1$ to $SL_3$ for the password and three deceiving locations $DL_1$ to $DL_3$ during the registration phase, a random array (see central row of circles in FIG. 7) of deceiving locations may be $SL_1$, $SL_2$, $DL_1$, $DL_2$, $SL_3$, and $DL_3$. Another random array $M_i$ of deceiving locations may be $SL_1$, $DL_2$, $SL_2$, $DL_1$, $DL_3$, and $SL_3$. Those skilled in the art would understand that there is a large number of arrays that can be generated based on the secret locations $SL_n$ and the deceiving points $DL_k$. Note that the first and last locations in the random array may be any of the secret and deceiving points.

The server 120 further generates, in step 510, a (new) random array of audible patterns $A_i$ A (styles) for the deceiving points $DL_k$ of the generated random array, when the array is different from zero. The random array $A_j$ is generated for each random array $M_i$. The random array $A_i$ includes a beeping pattern, selected by the user during the registration phase. An audible pattern, in one example, may include, for example, one beep for deceiving location $DL_1$ and two beeps for deceiving location $DL_2$. A more complex example audible pattern would be a first short beep for triggering the first deceiving location $DL_1$, a second longer beep for the second deceiving location $DL_2$, and a third short beep for the third deceiving location $DL_3$. Note that in one embodiment, an audible pattern is associated with the corresponding deceiving locations. This means that each audible pattern prompts the user to select a deceiving location, and the tapping style of the deceiving location should correspond to or match the audible pattern.

While the audible pattern has been characterized in terms of beeps, it should be recognized that it could be any collection of audible sounds that can be perceived by the user. For example, it could be different tones, e.g., long tones, short tones, and in between tones. It could also be musical notes, e.g., A, B, C, D, E, F, and G (with or without sharps or flats). The different audible sounds, as well as their type of sound, would be selected by the user during the registration process, and then would be employed in exchanges between the server and cellphone during the authentication process. The use of audible sounds provides for a wider range of security, than for example can be afforded by tactile feedback (e.g., vibrations). What is required is to have the audible sound correspond to a particular input the user would be able to make on a screen of the cellphone or other device he or she is or will be using. For example, in a system which employs musical notes, the user might have a single tap for A, a double tap for B, a triple tap for C, etc. That is, what is required is to have an audible signal that corresponds to a user inputtaple tapping during registration. Then, during authentication, when the user receives the audible signal, he or she knows where to tap on the image, as he or she knows the association of the sound with location on the image.

Returning to FIG. 5, the server 120 then generates in step 512, a new sequence X of secret locations $SL_n$ and deceiving locations $DL_k$ (corresponding to the random array $M_i$), along with a corresponding audible pattern or style $A_i$, for example, as schematically illustrated in FIG. 7. The sequence schematically illustrated in FIG. 7, shows that each secret location $SL_n$ needs to be tapped by the user, while for the deceiving locations $DL_k$, the user will tap them only if an audible signal or tone 902 prompts the user to do so. For example, if the user hears a beep 902 that is short, then the user needs to tap next a deceiving location $DL_1$, with a short tap. If the beep 904 he or she hears is long, the user needs to tap next another deceiving location $DL_2$, with a long tap. Subsequently, if he hears another short beep 900, the user needs to tap next yet another deceiving location.

Note that the user needs to tap all the secret locations $SL_1$ on the image according to the order established during the registration phase. However, for the deceiving locations $DL_k$, the user taps a deceiving location only when the smartphone 110 generates a corresponding audible signal or tone (902 or 904), and the style of the tap needs to match the style of the beep or tone (i.e., short beep, short tap; double beep, double tap; note B, double tap, etc.). In this way, the attacker cannot see or hear produced by the phone, and does not know that the deceiving points are not secret locations. The inability to hear may provide even more security as a very observant attacker might be able to deduce from the user's hands when vibrations are sent, but would have no means whatsoever to ascertain audible patterns or tones delivered only to the user's headphones or earphones.

Preferably, a new sequence is generated each time the user logs in into the server 120. This makes it practically impossible to infer the user's password through a shoulder attack. The sequence (which essentially is the password corresponding to the user ID plus one or two decoys (deceiving locations)) can become more complicated as the number of secret and/or deceiving locations is increased.

Returning to FIGS. 5 and 6 and the methods 500 and 600, the server 120 transmits in step 514, to the smartphone 110, a request (including the image, of, e.g., FIG. 8A or 8B) for tapping on the screen on the displayed image the secret and deceiving locations to get authenticated. The smartphone receives the image in step 605 and determines in step 606 whether an audible beep cue or tone command has been received from the server 120. If there was no audible cue received, the user taps on the image, displayed on the screen of the smartphone 110, the secret locations in the order established during the registration phase and the smartphone detects in step 608 the tapping (e.g., first tap). However, as the user taps one secret location (e.g., $SL_1$), which is automatically transmitted to the server 120 in step 608, and prepares to tap the next secret location (e.g., $SL_2$), the server 120 preferably sends an audible beep or tone to the user's headphones or earphone in step 516, as prescribed by the new sequence being used for the authentication being undertaken at the time by the user (i.e, preferably, there is a different audible beep or tone pattern for each authentication, e.g., when looking at FIG. 8B, the user could get two beeps right before entering the first secret location prompting him or her to tap on the lower left corner of the star first, but on another authentication, he or she might get only a single beep after both SL1 and SL2 have been tapped prompting him or her to then tap the top of the center circle DL1). That is, and by example, upon receiving the audible beeps or tones in step 606 from the server 120, the user is prompted to tap a deceiving location $DL_k$ (second tap) and not the next expected secret locations $SL_n$. The smartphone detects in step 610 the tapping associated with the audible beeps or tones sent to the user. Then, the user taps a next secret location if no audible signal or tone is sent to the headphones or earphone of the user. In contrast, if he or she receives another audible signal or tone, the user taps another (or the same if the audible beep or tone is the same) deceiving location. This tapping continues until the user has introduced all the preestablished secret and deceiving locations. The signals associated with the tapings of the secret and deceiving locations are transmitted by the smartphone 110 in step 612. The tapings of the secret and deceiving locations are received by the server 120 in step 518 and these locations and, in some embodiments, the length or style of the tapings (e.g., long tap, double tap, triple tap, etc.) for the deceiving locations are compared to the sequence generated in step 512. The server 120 determines in step 520 whether the locations are identical, and the tappings of the deceiving locations are correct. If the result is positive, the server grants access in step 522 to the user and the user can access the resources on the server in step 614. However, if the result of the determination step 520 is negative, the method may return to step 508, to generate another random array $M_i$, $A_i$, and sequence X to offer a new chance to the user to log in.

The discussed methods address the vulnerability of traditional picture password systems to shoulder surfing attacks, a common issue in public spaces like airplanes or public transport. By using audible signals or tones transmitted to the headphones or earphones of the user of the smart device (e.g., cellphone, tablet, computer), it protects the locations of secret spots from being visually observed. While enhancing security, the image and headphone or earphone based authentication method retains the usability and convenience of picture passwords, avoiding the need for additional hardware or overly complex user actions. In one implementation, unlike previous systems that require memorizing additional codes, patterns, or rules, the authentication method of the embodiments discussed above simplifies the user interaction process while maintaining a high level of security. The method and associated system leverage the headphones or earphones most user's of smart devices have for their modern smart devices, ensuring broad compatibility and eliminating the need for extra hardware. The audible instruction mechanism integrates seamlessly into the authentication process, providing an audible cue that enhances interaction and reduces the risk of errors. Furthermore, as the audible cue is provided privately (i.e., in the headphones or earphone worn only by the user), and it preferably varies each time the user is being authenticated, it allows for extremely high security. Moreover, it provides a robust alternative to a tactile cueing system. For many users, the audible signals may be easier to discern than vibratory signals. In addition, as discussed above, there are a variety of different audible patterns or tones that might be used (e.g., musical notes, etc.) in the system and method. In addition, the vibratory devices in modern cell phones might be detectable audibly by a close by attacker. Further, an extremely observant attacker might be able to visually perceive responses of the user's hand to vibratory signals.

By introducing deceptive and secret spots alongside the audible signals, the method minimizes the likelihood of "hotspots" (commonly used areas on an image), reducing predictability for attackers. Many earlier picture password systems were ineffective on small screens or required cumbersome actions like analyzing large grids. The method discussed above adapts effectively to the constraints of small screens. The combination of visual (image), audible private cueing in the user's headphones or earphones, and cognitive (deceiving spots) elements in the above method creates a highly robust, multi-modal authentication system.

Acknowledgment

This work was funded by the University of Jeddah, Jeddah, Saudi Arabia, under grant No. (UJ-23-SRP-11). The authors, therefore, thank the University of Jeddah for its technical and financial support.

The invention claimed is:

1. An authentication method for securely permitting access to a server from an electronic device operated by a user using audible cues provided to headphones or an earphone worn by the user, comprising:

receiving at the server a request for authorization sent by the electronic device;

displaying an image from one or more images stored by the server on the electronic device, wherein the image displayed at the electronic device has been registered at the server as being associated with a specific user, and wherein the image has a plurality of secret locations on the image to be touched in a specific order, and a plurality of deceiving locations on the image to be touched in a specific order, wherein each of the deceiving locations corresponds to one audible cue or tone selected from a plurality of audible cues or tones;

receiving input at the server from the electronic device corresponding to locations touched on the image displayed and an order in which the locations are touched, wherein the locations touched include the secret locations in the specific order and one or two of the deceiving locations interspersed with the secret locations;

providing plurality of audible cues or tones to headphones or an earphone of the user operating the electronic device in the form of a plurality of different musical notes during the receiving step; and granting the electronic device access to resources of the server only when input is received corresponding to touches on the image for each of the secret locations in the specific order, and input is received for each deceiving location of the plurality of deceiving locations based one or more of the musical notes of the plurality of different musical notes supplied to the headphones or earphone of the user to prompt the user to touch one or more of the deceiving locations, wherein the different musical notes correspond to different deceiving locations, wherein the input for each deceiving location is interspersed with the secret locations according to a time when the one or more musical notes is provided to the headphones or the earphone of the user.

2. The authentication method of claim 1 wherein at least two different musical notes are supplied to the user at two different times during the receiving input step.

3. The authentication method of claim 1 wherein the plurality of musical notes are supplied at different times for a different duration.

4. The authentication method of claim 1 wherein the electronic device is selected from the group consisting of a cellphone, a tablet, and a portable computer.

5. The authentication method of claim 1 wherein the one or more musical notes are delivered to the headphones of the user.

6. A system comprising a processor, display, audio interface, and memory configured to perform the method of claim 1.

7. An authentication method comprising displaying an image, delivering an audio cue through an earphone, and authenticating a user based on interaction with a subset of predefined image points indicated by the audio cue according to claim 1.

* * * * *